US005231625A

United States Patent [19]

Hokozono et al.

[11] Patent Number: 5,231,625

[45] Date of Patent: Jul. 27, 1993

[54] OPTICAL DISK DRIVE WHEREIN A PRESET READING LASER POWER IS USED TO GENERATE A DESIRED WHITE LASER POWER

[75] Inventors: Kazuo Hokozono; Tatsuoki Shinohara; Akira Tokizono, all of Fujisawa; Hideo Ueno, Yamato, all of Japan

[73] Assignee: International Business Machines Corporation, Armonk, N.Y.

[21] Appl. No.: 757,799

[22] Filed: Sep. 11, 1991

[30] Foreign Application Priority Data

Sep. 27, 1990 [JP] Japan ................................ 2/255468

[51] Int. Cl.^5 ................................................ G11B 7/00

[52] U.S. Cl. .................................... 369/116; 369/106

[58] Field of Search ............... 369/116, 106, 122, 100, 369/111; 250/205

[56] References Cited

U.S. PATENT DOCUMENTS 4,698,797 10/1987 Komatsu ............................ 369/116

4,796,250 1/1989 Kobayashi et al. .................. 369/54

5,067,122 11/1991 McGee ............................... 369/116

FOREIGN PATENT DOCUMENTS 6386591 of 0000 Japan .

58-100245 6/1983 Japan .

60-143438 7/1985 Japan .

61-184742 8/1986 Japan .

*Primary Examiner*—Paul M. Dzierzynski

*Assistant Examiner*—James Beyer

*Attorney, Agent, or Firm*—M. W. Schecter

[57] ABSTRACT

This invention relates to a technique for obtaining a desired laser power. In write mode the laser power in an optical disk drive is determined in accordance with a DAC value which controls a power supply for the laser, but the correlation between the laser power and the DAC value significantly varies depending on the efficiency of the individual laser diode or laser oscillator. Because the laser power in read mode has been adjusted to a predetermined value during manufacturing, the DAC value which generates the same laser power as the reading laser power is known and is used to generate the desired laser power, such as the writing laser power.

3 Claims, 3 Drawing Sheets

OPTICAL DISK DRIVE WHEREIN A PRESET READING LASER POWER IS USED TO GENERATE A DESIRED WHITE LASER POWER

BACKGROUND OF THE INVENTION

1. Field of the Invention

This invention relates to an optical disk drive , and more particularly, to an apparatus for adjusting the intensity of a laser beam, or the laser power therein.

2. Description of the Related Art

In an optical disk drive, the optimum laser power during a read operation does not strongly depend on the quality of individual optical disks. The read beam is reflected by the optical disk, or transmitted through the optical disk, but will not cause any change of the composition, shape, optical or magnetic properties of the optical disk.

On the other hand, the optimum laser power during a write operation, since the laser beam projected onto the optical disk will cause the change of the composition, shape, or optical or magnetic properties of the optical disk, significantly depends on the quality or the optical characteristics of individual optical disks. In addition, the optimum laser power during a write operation is influenced by the ambient temperature and by the life of the laser.

For this reason, the read laser power is adjusted in a process for adjusting the intensity of the beam during the manufacturing process of an optical disk drive and placed under feedback control by which a target value, that is, a constant value adjusted during said manufacturing process, is maintained. Also, after an optical disk drive has been manufactured, the write laser power is adjusted each time individual optical disks are loaded in the optical disk drive or regularly after the optical disk drive has been assembled.

The write laser power is adjusted by varying a digital value (DAC value) provided to a digital-to-analog converter (DAC) connected to a voltage-to-current converter (V-1 converter) used as the source which supplies current to the laser. Said DAC value is a digital value for establishing the laser power. An optimum value for the write power is detected following the steps of attempting to write a predetermined test pattern gradually increasing or decreasing a DAC value for each predetermined value, reading said test pattern, finding a DAC value which generates an optimum reading signal, storing the DAC value found in a memory, and finally generating a desired write laser power through the use of the stored DAC value for further writing.

In the conventional method, to perform the above test writing, the initial DAC value and an increment or a decrement (DAC step value) are used for varying DAC values as follows.

First, a reference voltage previously set to a proper value is stored in the optical disk drive. Said reference voltage is compared with the detected voltage of the laser power as the DAC value increases gradually from a very small value, and then the result of comparison is inverted assumed to be said initial DAC value. The DAC step value is a predetermined constant digital value.

In such a conventional apparatus, if the laser efficiency varies from product to product, the value of the laser power generated based on the same DAC step value significantly varies from product to product. On the other hand, an initial DAC value may significantly depend on the variation in the efficiency of the laser as well as the small stability of a reference voltage or a source voltage. Consequently, it becomes hard to obtain an optimum writing power.

SUMMARY OF THE INVENTION

The principal object of this invention is to obtain the optimum laser power in optical disk drives, despite the efficiency of the lasers therein varying with each product.

This and other objects of this invention, in view of the read laser power being adjusted with high accuracy using a light intensity meter during the manufacturing process, is intended to detect a DAC value which generates a laser power equal to the above reading laser power, and obtain, based on the detected DAC value, a DAC value which causes a desired laser power such as an initial DAC value, a DAC step, etc.

DESCRIPTION OF THE PREFERRED EMBODIMENT

Figure 1:
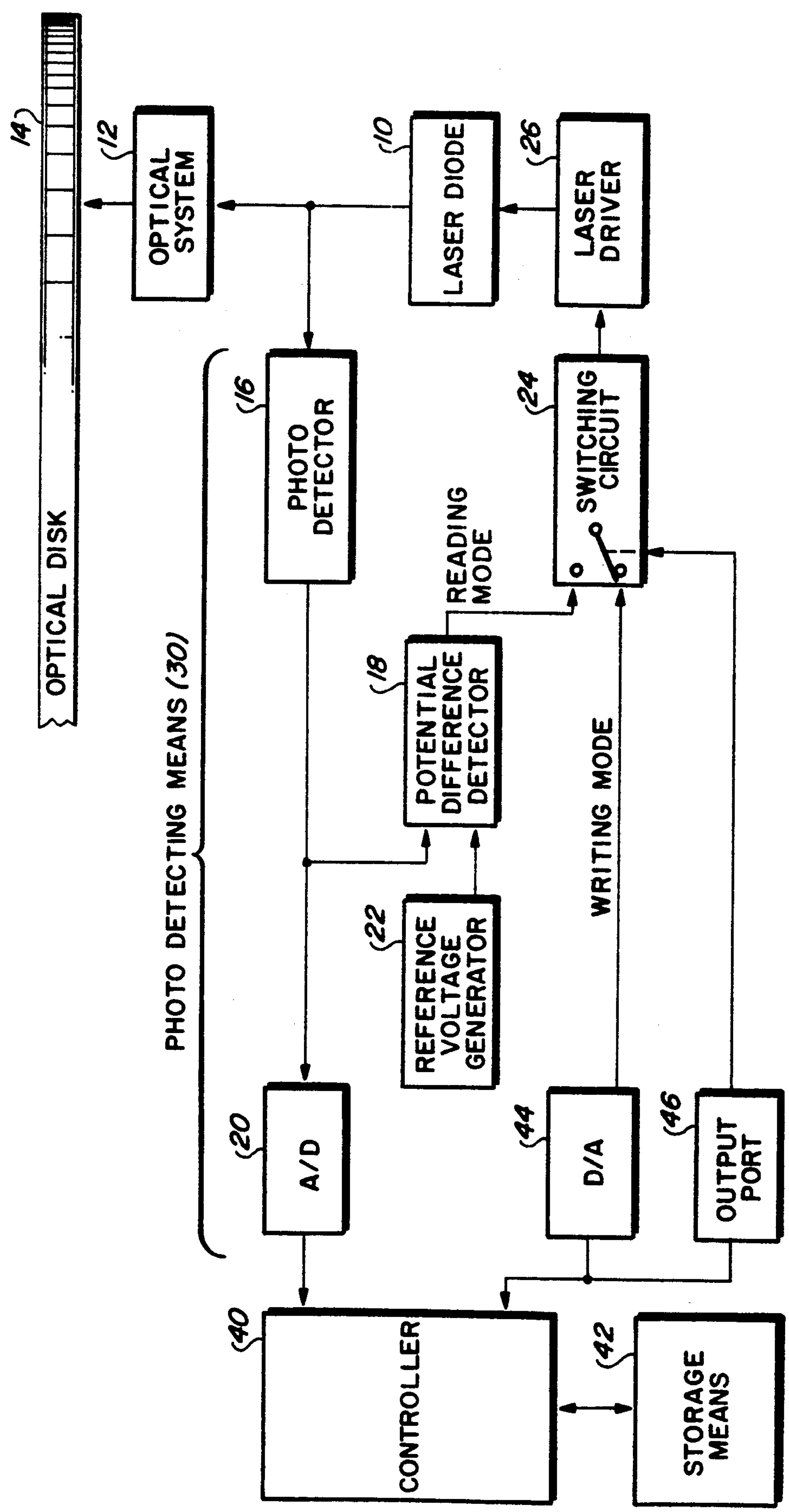
FIG. 1 shows an embodiment of an optical disk drive according to the invention.

In the following, the preferred embodiment of this invention is described referring to the drawing.

FIG. 1 shows an optical disk drive according to the invention. In the figure, a laser beam is emitted from a laser diode 10, which is a laser oscillator, and projected through an optical system 12 onto an optical disk 14, which is a recording medium. The intensity of the laser beam emitted from laser diode 10 is detected by a photo detector 16 and a detected analogue value is provided to a potential difference detector 18 and an analog-to-digital converter 20 in parallel.

The potential difference detector 18 compares a reference voltage generated by a reference voltage generator 22 with said detected analog value and outputs a voltage in accordance with the result of such comparison, through a switching circuit 24, to a laser driver 26. In read mode, the laser power is controlled so that a voltage detected by the photo detector 16 always becomes equal to a reference voltage generated by the reference voltage generator 22. This reference voltage is pre-adjusted during manufacturing of the optical disk drive. For this pre-adjustment, the intensity of laser diode 10 is observed through the optical system 12 by a light intensity meter.

During this observation, the reference voltage generated by the reference voltage generator 22 is adjusted until a desired laser power, that is, the value of an optimum reading laser intensity is observed by the light meter. The value of the laser power thus pre-adjusted under the read mode configuration has very high reliability. This pre-adjusted laser power value is denoted by $P_r$[W].

The driver 26, which can be divided into a voltage-to-current converter part and a variable current source part, provides a driving current to the laser diode 10 according to the result of said comparison by the detector 18. The driver 26, the laser diode 10, the photo detector 16, the potential difference detector 18, and the reference voltage generator 22 form a negative feedback loop by which the laser power is placed under negative feedback in which an output voltage generated by the reference voltage generator 22 is used as a target control value. The laser power is maintained to the predetermined value or the pre-adjusted value in the read mode by the negative feedback loop.

An analog value from photo detector 16 is converted to a digital value by an analog-to-digital converter 20. The photo detector 16 and the analog-to-digital converter 20 constitute a photo detecting means 30 which detects the laser power and outputs a digital value.

The digital value is stored, through a controller 40, in a storage means 42. Controller 40 contains a microprocessor and its software. The controller sends said digital value to the storage means 42 and also sends a digital value (DAC value) for establishing a laser power to a digital-to-analog converter 44. The digital-to-analog converter 44 generates a laser control signal (analog signal) in accordance with the digital value and then transmits it, through the switching circuit 24, to the drive 26. In write mode, the laser power is changed in accordance with the digital value. Read mode operation and write mode operation are switched to each other by the switching circuit 24 which is controlled by a switching control signal generated by the controller and provided through an output port 46.

The test write operation of this embodiment will now be described.

First, with the laser diode 10 turned off, a digital value generated by the photo detecting means 30 is stored in the storage means 42. The digital value indicates the offset voltage of the photo detector 16 and is represented by $D_{off}$. Then, with the switching circuit 24 set for read mode, the laser power (reading laser power) is controlled to maintain a predetermined value based on the reference voltage generator 22 under negative feedback control in the read mode. The laser power value in this case is $P_r$[mW], for example 1.5 mW.

The switching circuit 24 remains set to read mode to detect and store the digital value of the reading power $P_r$[mW] in the storage means 42. The digital value is represented by $D_r$. The DAC value (initial DAC value) at the start of trial writing is represented b $P_w$[mW] and the digital value at the time that laser power value is detected is represented by $D_w$. Because the digital values are linearly proportional to the laser power, the ratio ($D_r$—$D_{off}$):($P_r$—O) equals the ratio ($D_w$−$D_{off}$):($P_w$−O). Thus, by algebraic manipulation, the following expression is held. $P_w$ is, for example, 9.5 mW.

$$D_w = (D_r - D_{off}) \times \frac{P_w}{P_r} + D_{off} \quad \text{(Equation 1)}$$

With the switching circuit 24 set to write mode, the digital-to-analog converter 44 is provided with a DAC value small enough to establish a laser power which generates the reading laser power $P_r$[mW] and then the DAC value is gradually increased. At the same time, the digital value from the photo detecting means 30 is detected and a DAC value at the time the digital value becomes equal to $D_r$ or the closest value to $D_r$ is stored in the storage means 42. The DAC value at this point is represented by $I_r$. Because laser power $P_r$[mW] adjusted by a photo intensity meter during a manufacturing process, the DAC value $I_r$ thus obtained generates a laser power $P_r$[mW] with very high reliability.

The DAC value is increased until the digital value from the photo detecting means 30 reaches $D_w$ and the DAC value thus obtained is stored in the storage means 42. The DAC value is represented by $I_w$. When the laser power is generated, the linear part of the P-I characteristic curve of the laser oscillator is used. Accordingly, if the difference between two values showing laser power per bit of a DAC value is ΔP[mW/bit], then $$\Delta P = \frac{P_w - P_r}{I_w - I_{rR}} \quad \text{(Equation.2)}$$

From equation 2, an increment or a decrement (a DAC step value) of a DAC value corresponding to an increment or a decrement of the laser power for a trail writing can be obtained. If the initial laser power is, for example, 9.5 mW as shown above, and a decrement (increment) of the laser power is, for example 0.5 mW at the start of the trial writing, the trial writing is made based on laser powers of 9.5 mW, 9.0 mW, 8.5 mW, 8.0 mW . . . . According to the embodiment, as is obvious from the above, the DAC values which generate these laser powers can be obtained with high precision.

Once the DAC value $I_w$ by which the laser power $P_c$[mW] is to be generated is obtained, the DAC value $I_o$ by which a desired laser power $P_o$[mW] other than the laser power $P_w$ is to be generated can be obtained by the following expression. In this expression, the relationship between $P_w$ and $I_w$, previously obtained, is used.

$$I_o = \frac{I_w - I_r}{P_w - P_r} \times P_o + \frac{P_w I_r - P_r I_w}{P_w - P_r} \quad \text{(Equation 3)}$$

Figure 2:
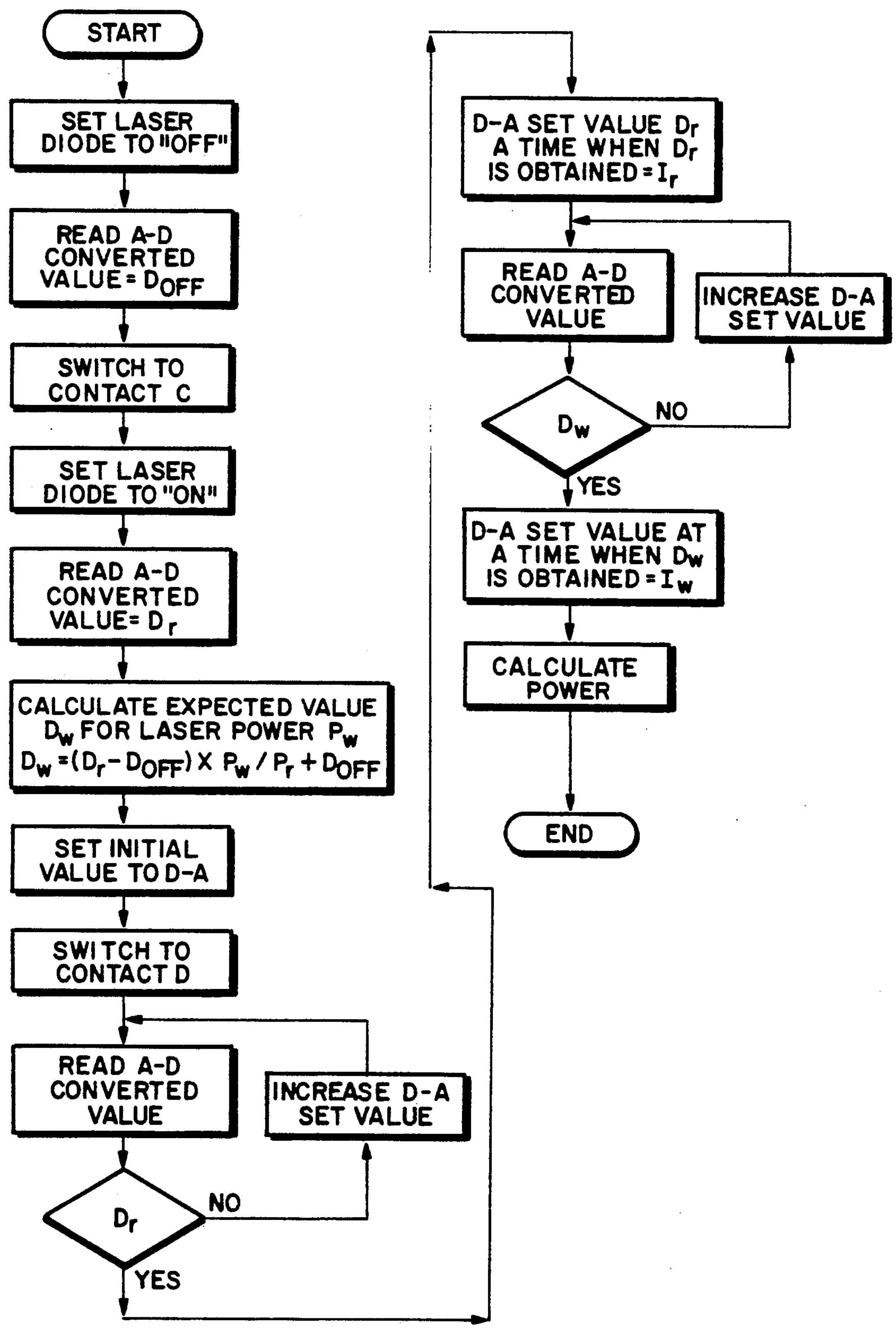
FIG. 2 is a flowchart showing how to determine DAC values in said embodiment.
Figure 3:
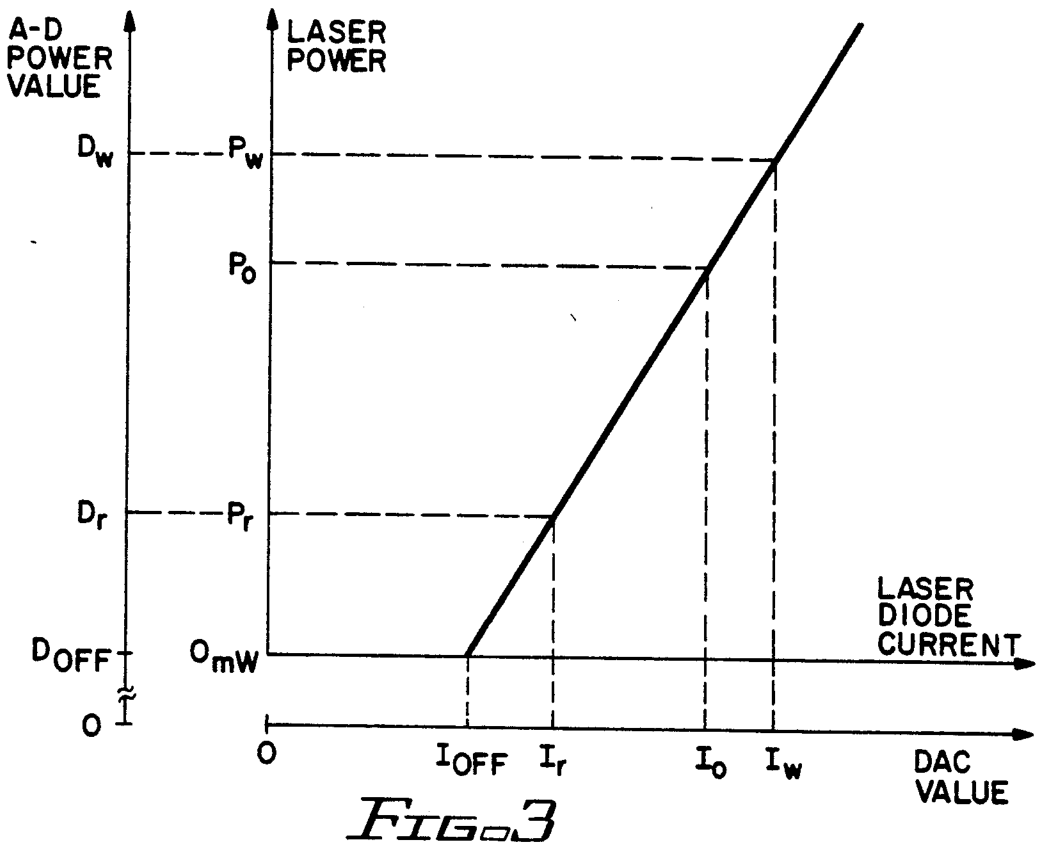
FIG. 3 is a graph showing the relationship between DAC values and laser power values in said embodiment.

FIG. 2 is a flowchart showing the operations of the embodiment. FIG. 3 shows the relationship between DAC values and laser power values in the embodiment.

Figure 4:
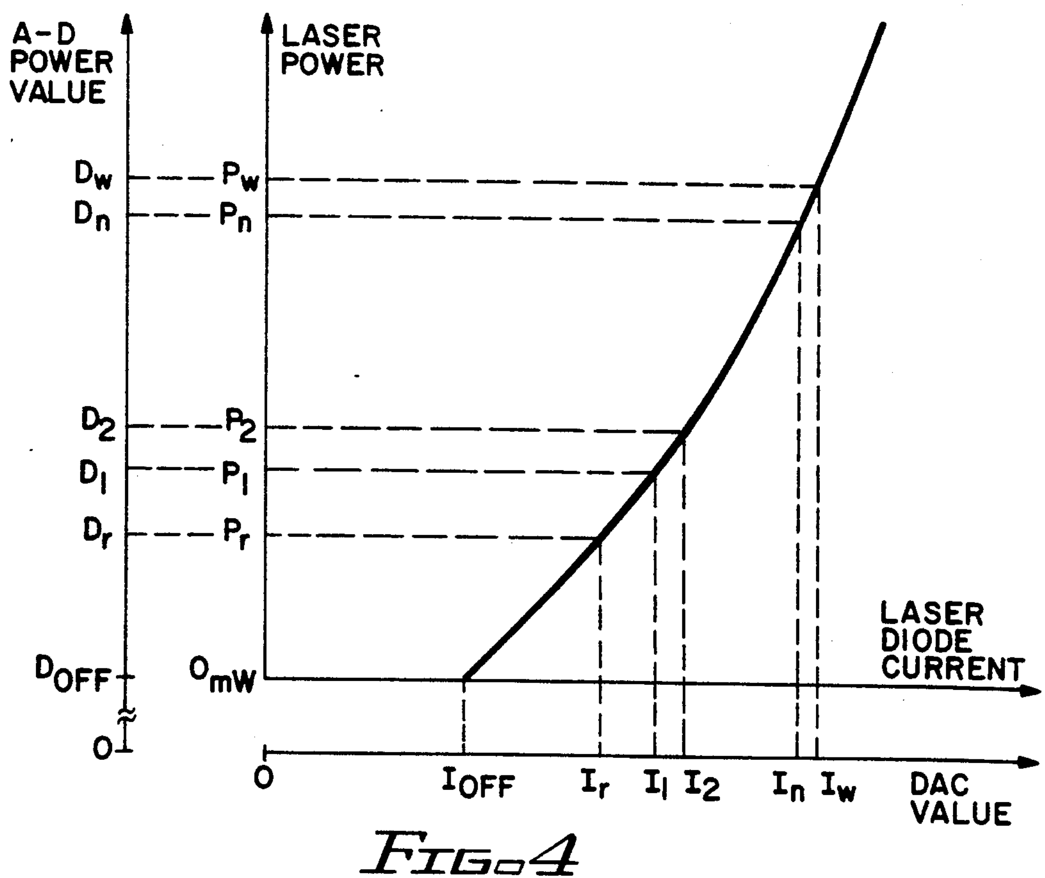
FIG. 4 is a graph showing the relationship between DAC values and laser power values in an alternative embodiment.

In said embodiment, the P-I characteristic of a laser oscillator is linear, as shown in FIG. 3. However, it will be appreciated that if the P-I characteristic of the laser oscillator, as shown in FIG. 4, is not linear, equation 1 may be applied to each of the desired laser power values. For example, if the values of desired laser power are $P_1, P_2, \ldots, P_n$, the following expressions can be used.

$$D_1 = (D_r - D_{off}) \times \frac{P_1}{P_r} + D_{off}$$

$$D_2 = (D_r - D_{off}) \times \frac{P_2}{P_r} + D_{off}$$

$$D_n = (D_r - D_{off}) \times \frac{P_n}{P_r} + D_{off}$$

Now, as in said embodiment, DAC values are gradually increased to obtain the DAC values $I_1, I_2, \ldots, I_n$ which cause digital values equal to $D_1, D_2, \ldots D_n$, respectively.

While this invention has been particularly shown and described with reference to a preferred embodiment thereof, it will be understood by those skilled in the art that various changes in form and details may be made therein without departing from the spirit and scope of the invention. Accordingly, the invention disclosed herein is to be limited only as specified in the following claims.

What is claimed is:

1. An optical disk drive capable of operating in a constant laser power mode, wherein a laser power is maintained at a constant value, and in a variable laser power mode, wherein a laser power is varied in accordance with a digital input value; the optical disk drive comprising:

a laser;

photo detecting means for detecting said laser intensity and generating a first digital value;

storage means for storing said first digital value; and control means for storing the first digital value in said storage means when the laser power has been detected by said photo detecting means with the optical disk drive operating in constant laser power mode, for obtaining a second digital value when a digital value with the optical disk drive operating in variable laser power mode becomes substantially equal to the first digital value with the optical disk drive operating in constant laser power mode and stored in said storage means, and for determining, based on the second digital value, a digital input value for establishing a desired laser power with the optical disk drive operating in the variable laser power mode.

2. The optical disk drive according to claim 1 wherein said constant laser power mode is a read mode and said variable laser power mode is a write mode, said constant value adjusted during manufacturing using a light intensity meter.

3. An optical disk drive capable of operating in a read mode, wherein a power of a laser beam projected onto a recording medium is maintained at a predetermined value pre-adjusted during manufacturing, and in a write mode, wherein a laser power is varied in accordance with a digital input value, and wherein a test writing operation is performed to determine said digital input value which causes a proper write laser power based on the result of writing operations to said recording medium with the optical disk drive operating in write mode, the optical disk drive comprising:

a laser;

photo detecting means for detecting said laser intensity and generating a first digital value;

storage means for storing the first digital value; and control means for storing the first digital value in said storage means with the optical disk drive operating in read mode, for obtaining a second digital value when a digital value with the optical disk drive operating in write mode becomes equal to the first digital value stored in said storage means with the optical disk drive operating in read mode; and for determining, based on the second digital value, a digital input value for establishing a desired laser power during said test writing operation.

* * * * *

UNITED STATES PATENT AND TRADEMARK OFFICE
CERTIFICATE OF CORRECTION

PATENT NO. : 5,231,625

DATED : July 27, 1993

INVENTOR(S) : Kazuo Hokozono, et. al.

It is certified that error appears in the above-indentified patent and that said Letters Patent is hereby corrected as shown below:

On the Title page, item [54], and col. 1, line 4, in the Title , the word "WHITE" should be --WRITE--.

Signed and Sealed this

Twenty-sixth Day of April, 1994

Attest:

BRUCE LEHMAN

Attesting Officer

*Commissioner of Patents and Trademarks*